United States Patent

Della Vedova

[11] Patent Number: 5,987,052
[45] Date of Patent: Nov. 16, 1999

[54] METHOD TO CONTROL THE POWER SUPPLY FOR ELECTRIC ARC FURNACES

[75] Inventor: Ferruccio Della Vedova, Zugliano, Italy

[73] Assignee: Centro Automation SpA, Buttrio, Italy

[21] Appl. No.: 09/124,838

[22] Filed: Jul. 30, 1998

[30] Foreign Application Priority Data

Jul. 31, 1997 [IT] Italy .................................. UD97A0138

[51] Int. Cl.$^6$ .................................................. H05B 7/148
[52] U.S. Cl. ........................... 373/104; 373/102; 364/550
[58] Field of Search .................................. 373/102–107; 364/550, 506

[56] References Cited

U.S. PATENT DOCUMENTS

| | | | |
|---|---|---|---|
| 3,909,242 | 9/1975 | Skreien | 373/104 |
| 4,852,119 | 7/1989 | Montgomery | 373/104 |
| 4,881,239 | 11/1989 | Stenzel et al. | 373/70 |
| 5,099,438 | 3/1992 | Gulden, Jr. et al. | 364/550 |

FOREIGN PATENT DOCUMENTS

| | | |
|---|---|---|
| 0317948 | 5/1989 | European Pat. Off. . |
| 3149175 | 6/1983 | Germany . |
| 3616344 | 11/1987 | Germany . |
| 4415722 | 11/1995 | Germany . |
| 4415727 | 11/1995 | Germany . |
| 9526118 | 9/1995 | WIPO . |

OTHER PUBLICATIONS

Timm et al "Rechnergestutzte Prozessbeobachtung des Schmelzvorganges", Feb. 1987, Germany, pp. 26–36, Elektrowaerme International, Edition B.

Staib et al "The intelligent arc furnace controller: a neural network electrode position", IJCNN International Joint Conference (Maryland, USA 711 Jun. 1992, IEEE, pp. 1–9, vol. 3.

Primary Examiner—Tu Ba Hoang
Attorney, Agent, or Firm—Antonelli, Terry, Stout & Kraus, LLP

[57] ABSTRACT

Method to control the power supply for electric arc furnaces, whether they be fed with AC or DC, the furnaces including a melting cycle which includes the loading of the scrap carried out at time $T_0$, an initial step of pre-melting the scrap with low and average power with a duration of $(T_1-T_0)$, a step of melting at maximum power with a duration of $(T_2-T_1)$ and a refining step with a duration of $(T_3-T_2)$, the method including the dynamic identification of the approximate moment when situations of risk inside the furnace cease, with a consequent permission to start delivery of maximum power, the dynamic identification being governed by the control and analysis of the electrical quantities, tension and current, fed to the furnace.

9 Claims, 3 Drawing Sheets

METHOD TO CONTROL THE POWER SUPPLY FOR ELECTRIC ARC FURNACES

FIELD OF APPLICATION

This invention concerns a method to control the power supply for electric arc furnaces.

The invention is applied in the field of steel working, to regulate and control the supply of power in electric arc furnaces, particularly at the start of the melting cycle, in order to reduce the overall times of the cycle and to make savings in the total power supplied.

STATE OF THE ART

It is well-known that in electric arc furnaces to melt metal, at the beginning of the melting cycle, that is immediately after the scrap has been loaded into the furnace, the value of the electric power supplied through the electrodes is always less than the maximum available power.

This is because, given the consistency of the load of scrap, there is a great danger that there might be a short circuit between the electrodes and that the electric arc might be unstable.

Moreover, when there is a considerable amount of power available, the electrodes themselves can be subject to great mechanical stresses which can also cause the electrodes to break or at least be damaged.

Furthermore, there is a risk that due to radiance the arc may hit the lateral cooling panels of the furnace, breaking or damaging them.

At present, power is initially made available at a reduced value in order to reduce the aforesaid risks; the power is then increased, after a certain period of time, until it reaches the maximum available value which is compatible with the melting equipment and the requirements of the cycle.

This interval is normally defined according to operating experience and the increase in power delivered to the furnace takes place after a period which can guarantee adequate safety conditions which will overcome the aforesaid risks of short circuits and of dangerous stresses for the electrodes.

This interval of time, which is defined in advance, is fixed in such a way as to guarantee such safety conditions even in the most unfavourable and dangerous situations, and is therefore, in the majority of cases, excessive and too long for real and specific requirements.

For this reason, in all those cases where the delay times are longer than necessary before delivery of maximum power begins, the melting cycle is needlessly prolonged; this obviously lengthens the times of the cycle and also causes excessive power consumption.

The article by Timm K. et al "Rechnergestüzte Prozessbeobachtung . . . " taken from ELEKTROWAERME INTERNATIONAL, EDITION B, February 1987, vol. 45, n°. 1, pages 29–36, describes a method to control the feed of an electric furnace wherein an analysis is made of the development of the spectrum of frequencies of the electrical dimensions of the arcs (tension, current, power, conductance) as the melting cycle proceeds.

The purpose of this analysis is to control the development of the foamed slag which is generated inside the furnace so as to obtain improvements in the cycle in operational and technological terms.

There is no reference to any control of the quantities of the furnace to identify the approximate instant when to increase the delivery of power and take this power up to working schedule.

The present applicant has designed, tested and embodied this invention to overcome the shortcomings of the state of the art, which businessmen in the field have long complained of, and to achieve further advantages.

SUMMARY OF THE INVENTION

The purpose of the invention is to provide a method to control the supply of electric power for electric arc furnaces wherein it is possible to determine case by case the moment in time, or the approximate moment in time with a predefined safety margin, wherein it is possible to increase the supply of electric power to the furnace without incurring any risks of short circuits or of dangerous stresses on the electrodes or of radiance of the arc towards the side panels.

In other words, the invention proposes to identify a method whereby it is possible to identify substantially in real time, during the course of the first step of the melting cycle, the cessation of the above-mentioned situations of risk, and therefore to give the permission for the delivery of maximum power available according to the specific conditions which occur in a specific situation.

This invention, therefore, reduces the duration of the low power preliminary step which characterizes the melting cycles in electric arc furnaces and therefore reduces the overall times of the cycle, with consequent advantages in terms of the number of cycles carried out in a defined period of time and also in terms of energy saving.

According to the invention, the method controls and analyses dynamically the evolution of the electrical quantities of the furnace as the melting cycle proceeds, and then compares them with values relating to a model assumed as a reference situation.

The reference situation is based for example on practical experiments after a certain number of initial parameters have been fixed, such as the size of the furnace, the melting profile, the type and form of the load etc., or otherwise it is identified dynamically in the very first stages of the furnace being activated; it makes it possible to achieve a model of comparison wherein the transition zone, at which the furnace passes from a situation of risk to a safe situation, is identified.

The transition zone is characterized by a specific development of the electrical quantities, both in terms of time and of harmonic content.

By dynamically monitoring the electrical quantities during the course of the specific melting cycle, and by comparing them with the reference values of the said model, the invention makes it possible to identify, substantially in real time and in a sufficiently safe way, the moment when the situation of risk ends; it also gives permission for the delivery of maximum power to be reached in conditions of substantially safety.

In this way, the invention makes it possible to pass to maximum power as soon as possible and therefore it minimises the overall times of the melting cycle, case by case and in a dynamic and specialised manner.

BRIEF DESCRIPTION OF THE DRAWINGS

The attached Figures are given as a non-restrictive example and show some preferential embodiments of the invention as follows.

DETAILED OF THE DRAWINGS

Figure 1:
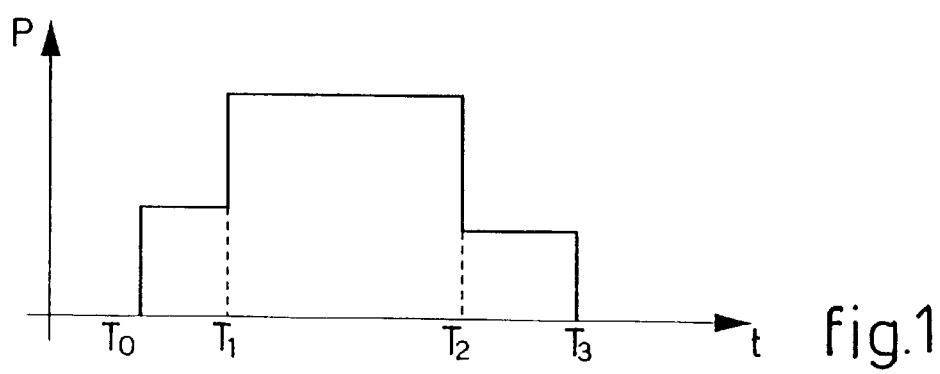
FIG. 1 shows a time/power graph of a standard melting cycle in an electric arc furnace.

FIG. 1 shows a possible melting profile for an electric arc furnace, in diagram form.

$T_0$ indicates the moment when melting starts, $T_1$ indicates the end of the pre-melting of the scrap, which is normally carried out at low or medium power, $T_2$ indicates the end of melting proper, which is carried out with the power at its maximum available value, while $T_3$ indicates the end of the refining step and therefore the end of the complete cycle.

The duration of the period between $T_1$ and $T_0$, that is the period when the pre-melting of the scrap loaded inside the furnace takes place and the furnace is fed with low or medium power, is the period of time which the invention intends to reduce, bringing forward as much as possible the moment when maximum power can be delivered and consequently reducing the overall times of the cycle, with a consequent saving of energy.

Figure 3:
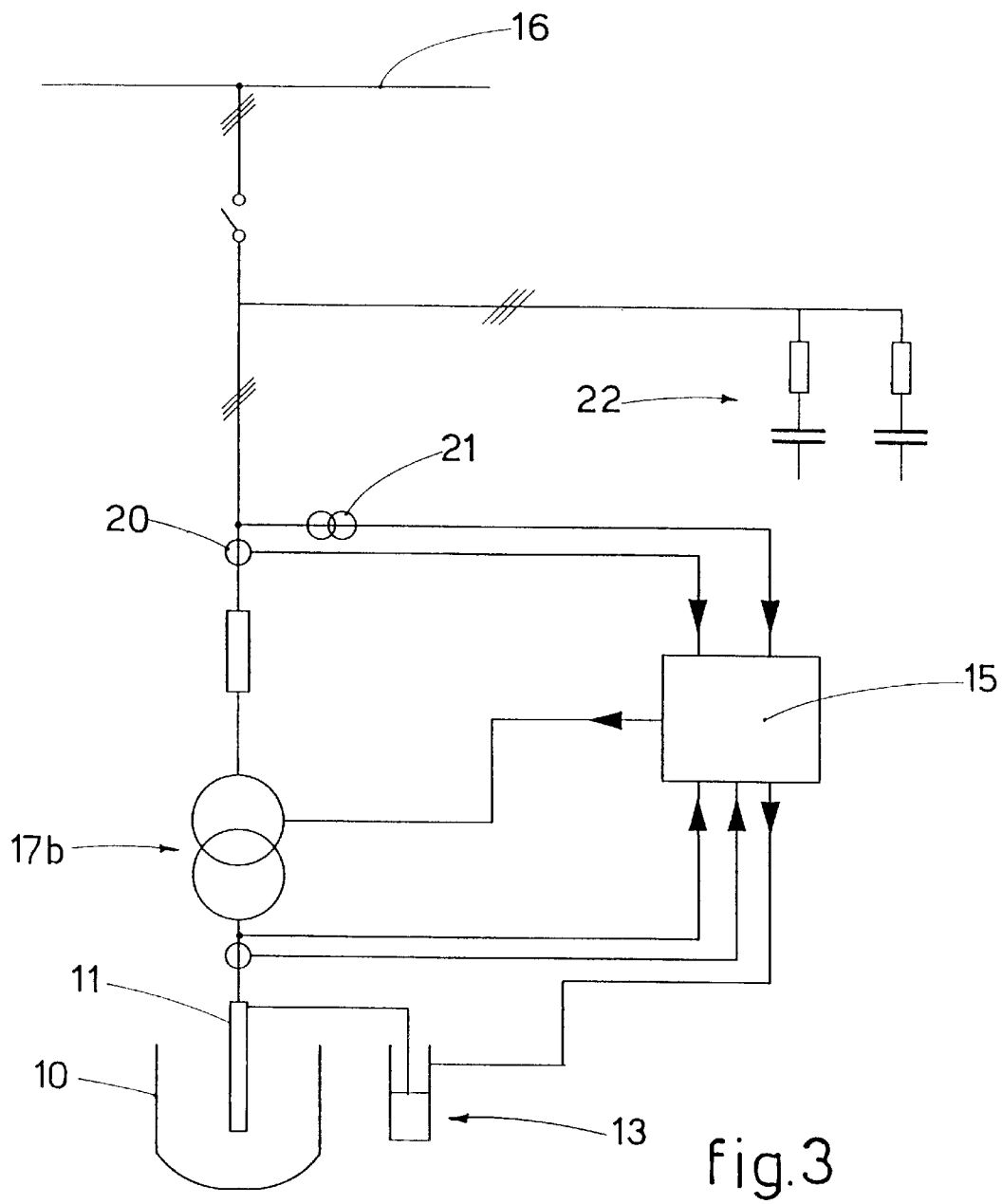
FIGS. 2 and 3 show in diagram form the power supply system respectively for an electric furnace fed with direct current and for an electric furnace fed with alternating current.
Figure 2:
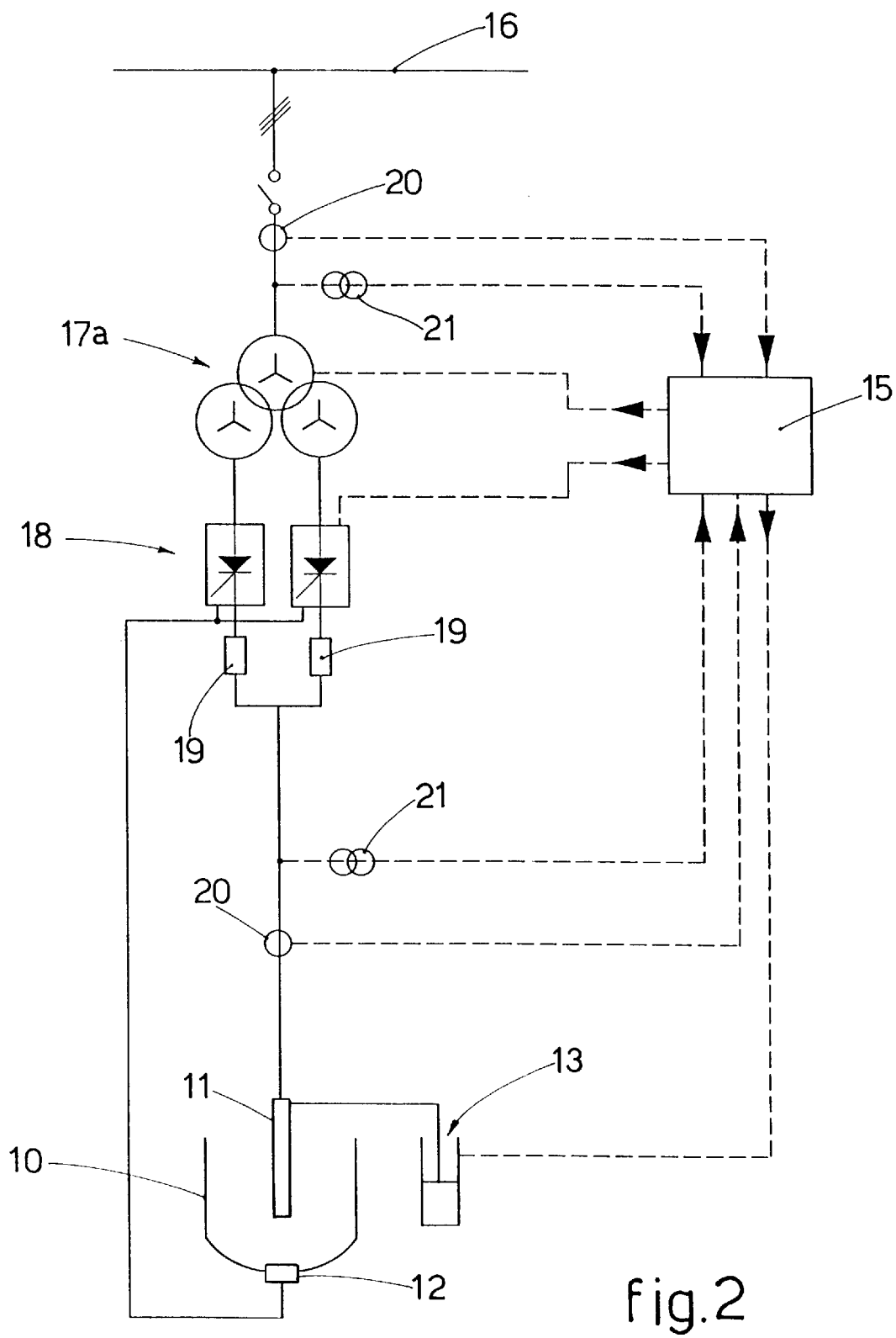

FIGS. 2 and 3 show two possible electric systems for the controlled feed of, respectively, a furnace fed with direct current (DC) and a furnace fed with alternating current (AC).

In these figures, the parts which are common to both furnaces have the same reference numbers.

The reference number 10 denotes the electric arc furnace, inside which there is the upper electrode or electrodes 11; in the case of a DC furnace, the lower electrodes 12 are situated on the floor.

The upper electrode 11 is controlled by a regulation system 13, either hydraulic or electric, which regulates the position 14 governed in feedback by the control unit 15 which manages the working of the furnace 10.

The electric power fed to the furnace 10 is taken from the medium tension supply network 16 and transformed by the appropriate transformers, respectively 17a for the DC furnace and 17b for the AC furnace.

In the case of the DC furnace, downstream from the transformer 17a there is a regulation system 18 with thyristor valves commanded by the control unit 15 by means of which it is possible to control the profile of the power supplied to the furnace 10 through the electrodes 11 and 12.

Each system with the thyristor valves 18 is followed by a relative inductor 19.

On the supply line, upstream and downstream of the transformer, there are measuring assemblies 20 and 21 which send their signals to the control unit 15 in order to keep the electrical quantities of the furnace 10 under control.

In the case of the AC furnace, the inductor 19 is located upstream of the transformer 17b, while parallel to the supply line there is a group of phase advancing condensers 22.

The invention provides to keep a constant control of the evolution of the electrical quantities, that is to say, the tension and current, of the power fed to the furnace, in order to verify, by using reference models obtained by experiments or found dynamically in the initial step of the cycle, the moment when the situations of risk connected to the initial step of the melting cycle can be considered to have ended within a reasonable safety margin.

The method according to the invention provides to carry out on the electrical quantities either a temporal analysis or a spectral analysis or both, in order to obtain the parameters which are to be used in comparison with the aforementioned reference model.

According to the invention, the temporal analysis provides to determine specific statistical parameters relating to the development in time of the tension and/or the current of the power supply to the furnace.

In one embodiment of the invention, the statistical parameter, calculated dynamically and compared with the value of the reference model of the control unit 15, is the variance, that is to say the square of the root deviation from the average value, of the specific electrical quantity of the furnace power supply, either the tension or the current.

When the variance of the signal analysed and controlled assumes a value which, beyond a defined safety threshold, can be compared with the specific value of the reference model, this indicates that the situations of risk have ended and permission can be given to increase the level of power supplied to the furnace.

In a preferential embodiment of the invention, the average variance of the electrical signal is calculated, used as a control, in a first time interval following the start of the cycle.

This time interval can be, for example, between 30" and 1'.

This average value of variance, calculated over the first interval after the furnace has been activated, is taken as a reference parameter.

As the melting cycle proceeds, the average variance value is continuously up-dated using the sliding average technique, keeping the interval of time on which the average value is calculated constant.

In other words, to calculate the average value the new instantaneous values, monitored continuously, are gradually added one by one, and substitute the corresponding initial values.

When the average variance value, continuously up-dated, is reduced to a value in the order of 60÷70% with respect to the same average value calculated during the start-of-cycle interval, then permission is given to increase the delivery of power.

In another embodiment, which may be an alternative to, or combined with, the previous one, this control is carried out by analysing the spectrum of frequencies of the quantities of the power supply to the furnace, or by analysing their harmonic content in order to obtain dynamic information on the behaviour of the furnace.

In this case too, by continuously comparing the harmonic content of the actual quantities of the power supply to the furnace and the respectively values of the reference model, it is possible to identify the moment when the situations of risk have ended, and therefore to give permission to increase the power with safety.

In a preferential embodiment of the invention, in a determined initial interval, the averages of the amplitudes of a certain number of even harmonics and a mating number of odd harmonics are calculated.

In this case too, the interval of time can be, for example, between 30" and 1'.

The ratio between the average value of the amplitudes of the even harmonics and the average value of the amplitudes of the odd harmonics is taken as a parameter of reference.

As the cycle proceeds, the averages of the amplitudes calculated separately on the even and odd harmonics are continuously up-dated with the above-mentioned sliding average method, with a consequent up-dating of the relative ratio.

When this ratio is reduced to value of about 60÷70% with respect to the initial reference value, permission is given to increase the power.

Figure 4:
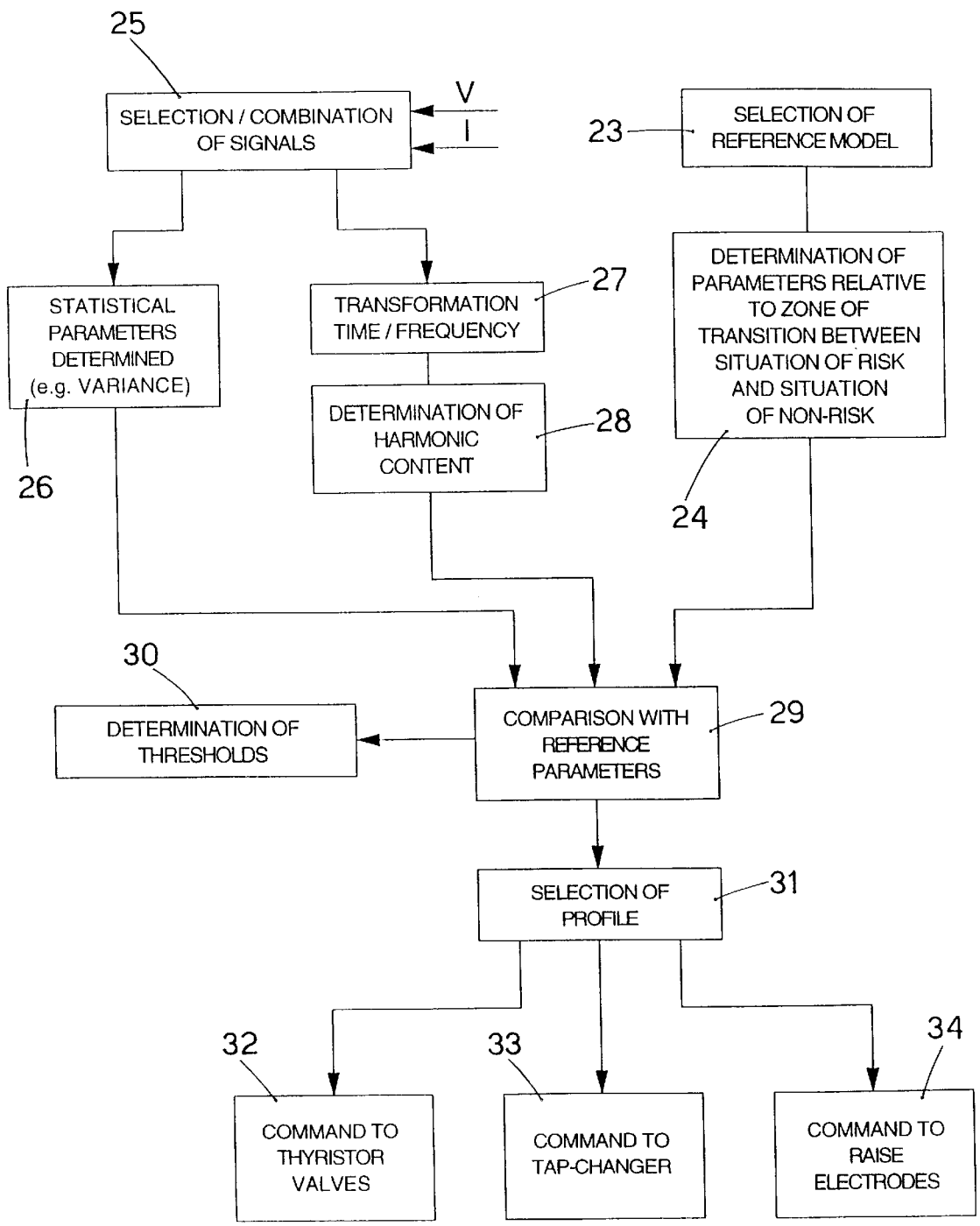
FIG. 4 shows a block diagram of the method according to the invention.

The block diagram shown in FIG. 4 schematically summarises the above.

According to this diagram, there is a preliminary choice of a reference model 23 according to the characteristics of the electric arc furnace 10 and the power profile desired, with a determination 24 of the parameters relating to the zone of transition between a situation of risk and a situation of non-risk.

The reference model 23 can be obtained experimentally or, as seen above, it can be obtained dynamically when the furnace is in the first stage of activation.

These parameters are memorised in a precise area of the memory in the control unit 15.

On the other hand, once the melting cycle has been started, there is the selection/combination 25 of the electrical signals, such as the tension V or the current I, to be used in the verification.

If analysis on a time basis is used, there is a procedure 26 to determine the statistical parameters, for example, the variance, on which the comparison will be made.

If spectral analysis is used, there is first a transformation 27 of time/frequency, and then a procedure 28 to determine the harmonic content of the transformed signal.

As we said before, both types of analysis can be used and the results combined, for example for safety reasons.

When the values of the selected parameters have been obtained, a comparison 29 is made with the values of the reference model, after first determining 30 the threshold values which have to be considered according to the desired safety levels.

When the comparison indicates that there is no longer a condition of risk of short circuits or stresses on the electrodes 11, the control unit 15 can activate the selection 31 of the next step of the power profile, that is, the delivery of maximum power.

This intervention of the control unit 15, depending on the type of furnace 10, acts either on the command of the thyristor valves 32, or on the tap-changer 33 or on the command to raise the electrodes 34.

Therefore, with this method, the delivery of maximum power always takes place, and in a specialised manner according to the type of furnace and to the melting conditions, as soon as the conditions for doing so in safety have been determined; this leads to a reduction of the overall times of the cycle and to a considerable saving of energy.

I claim:

1. A melting cycle for an electric arc furnace, comprising:
    loading scrap at a time $T_0$, into the furnace;
    pre-melting the scrap with low and average power with a duration of $(T_1-T_0)$;
    controlling and analyzing electrical quantities, tension and current fed to the furnace and, based thereon, identifying when situations of risk cease inside the furnace; and then
    melting the scrap at maximum power with a duration of $(T_2-T_1)$; and
    refining with a duration of $(T_3-T_2)$.

2. Method as in claim 1, the step of identifying when situations of risk cease inside the furnace comprises comparing the development of characteristic parameters of the electrical quantities with reference parameters so as to identify when situations of risk inside the furnace end.

3. Method as in claim 2, wherein the characteristic parameters of the electrical quantities are of the temporal type.

4. Method as in claim 3, wherein the characteristic parameter which is compared with the reference values is variance.

5. Method as in claim 4, wherein comparing the development of characteristic parameters with reference parameters comprises calculating an average value of variance, up-dated continuously as the melting cycle proceeds, over an interval of time of a determined amplitude, to obtain a continuously up-dated average value, comparing the continuously up-dated average value with an average value of variance calculated in the start-of-cycle interval which has the determined amplitude and taken as a reference parameter, and giving permission to increase delivery of power to the furnace when the average value of variance has been reduced to at least 60% with respect to the reference parameter.

6. Method as in claim 5, wherein the interval of time has a duration of between 30" and 1'.

7. Method as in claim 2, wherein the characteristic parameters of the electrical quantities are harmonic contents of the electrical quantities.

8. Method as in claim 7, wherein comparing the development of characteristic parameters with reference parameters comprises calculating separately average values of amplitudes of a determined number of even harmonics and odd harmonics over an initial interval of time of a determined amplitude, calculating a ratio between the average values and taking the ratio as a parameter of reference, continuously calculating this ratio as the melting cycle proceeds and giving permission to increase delivery of power to the furnace when the ratio is reduced to a value of around 60% with respect to the reference parameter.

9. Method as in claim 8, wherein the interval of time has a duration of between 30" and 1'.

* * * * *